United States Patent [19]

Onuma

[11] Patent Number: 5,680,623
[45] Date of Patent: Oct. 21, 1997

[54] PROGRAM LOADING METHOD WHICH CONTROLS LOADING OF PROCESSING PROGRAMS OF A COMPUTER FROM A SERVICE PROCESSOR WHICH SUPPORTS THE COMPUTER

[75] Inventor: Tadashi Onuma, Kawasaki, Japan

[73] Assignee: Fujitsu Limited, Kawasaki, Japan

[21] Appl. No.: 617,592

[22] Filed: Mar. 19, 1996

[30] Foreign Application Priority Data

Jun. 5, 1995 [JP] Japan .................. 7-138215

[51] Int. Cl.⁶ .................................................. G06F 9/44
[52] U.S. Cl. .................................... 395/712; 395/704
[58] Field of Search ............................ 395/712, 651, 395/652, 704

[56] References Cited

U.S. PATENT DOCUMENTS

| | | | |
|---|---|---|---|
| 4,970,639 | 11/1990 | Diefendorf et al. | 395/712 |
| 5,155,847 | 10/1992 | Kirouac et al. | 395/712 |
| 5,295,263 | 3/1994 | Kojima et al. | 395/712 |
| 5,339,450 | 8/1994 | Nagahara | 395/712 |
| 5,367,686 | 11/1994 | Fisher et al. | 395/712 |

*Primary Examiner*—Kevin A. Kriess
*Attorney, Agent, or Firm*—Staas & Halsey

[57] ABSTRACT

A program loading method loads a processing program that operates on a computer into the computer under control of a control program that operates on a service processor which is coupled to the computer. The processing program includes a predetermined processing procedure part that carries out a predetermined process according to a predetermined procedure. The program loading method includes the steps of (a) providing in the processing program a function of declaring a provisional execution mode and a process of judging whether or not the processing program is executable on the loaded computer when loading at least a portion of the processing program from the service processor to the computer, where the provisional execution mode is a mode in which the processing program is provisionally executed on the computer to judge whether or not the processing program is actually executable, (b) providing in the service processor a diagnosis instruction that is called from the processing program, where the diagnosis instruction includes functions of cancelling the provisional execution mode and discontinuing execution of the processing program, and (c) judging whether or not the processing program is executable prior to execution of the predetermined processing procedure part within the processing program, and cancelling the provisional execution mode of the processing program from the service processor if executable and suppressing execution of the processing program from the service processor if non-executable.

13 Claims, 8 Drawing Sheets

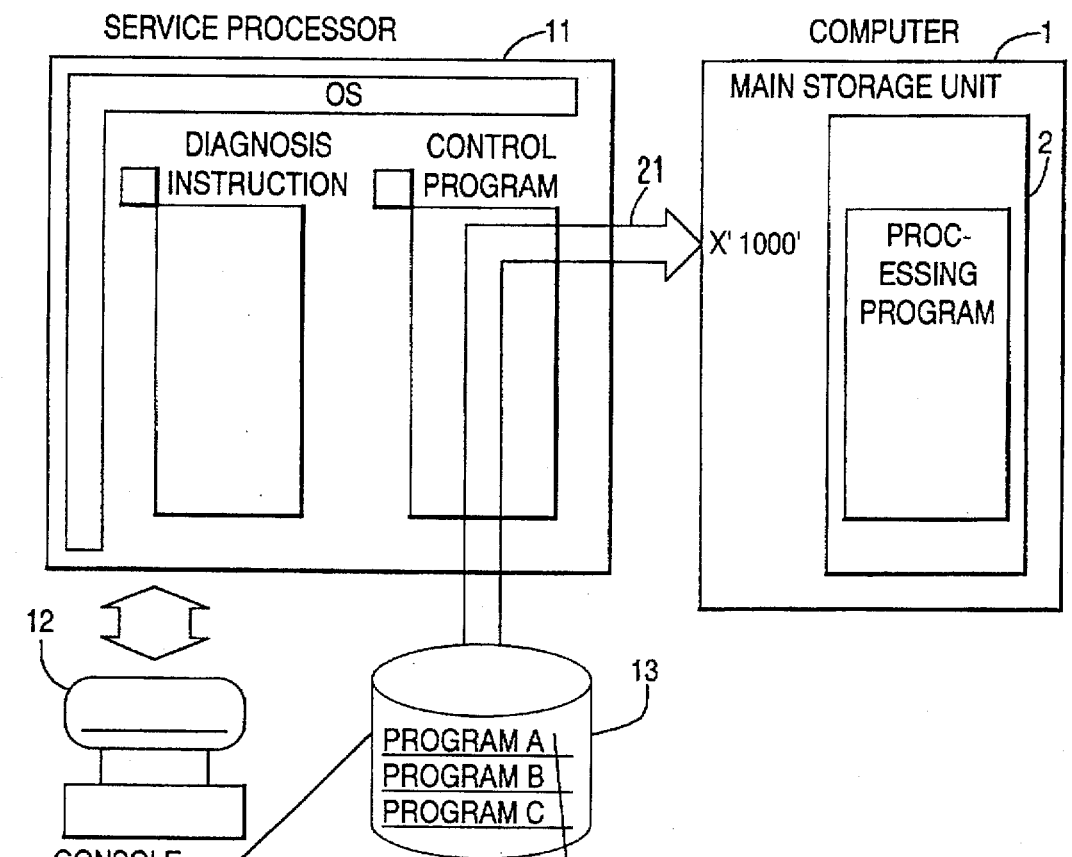
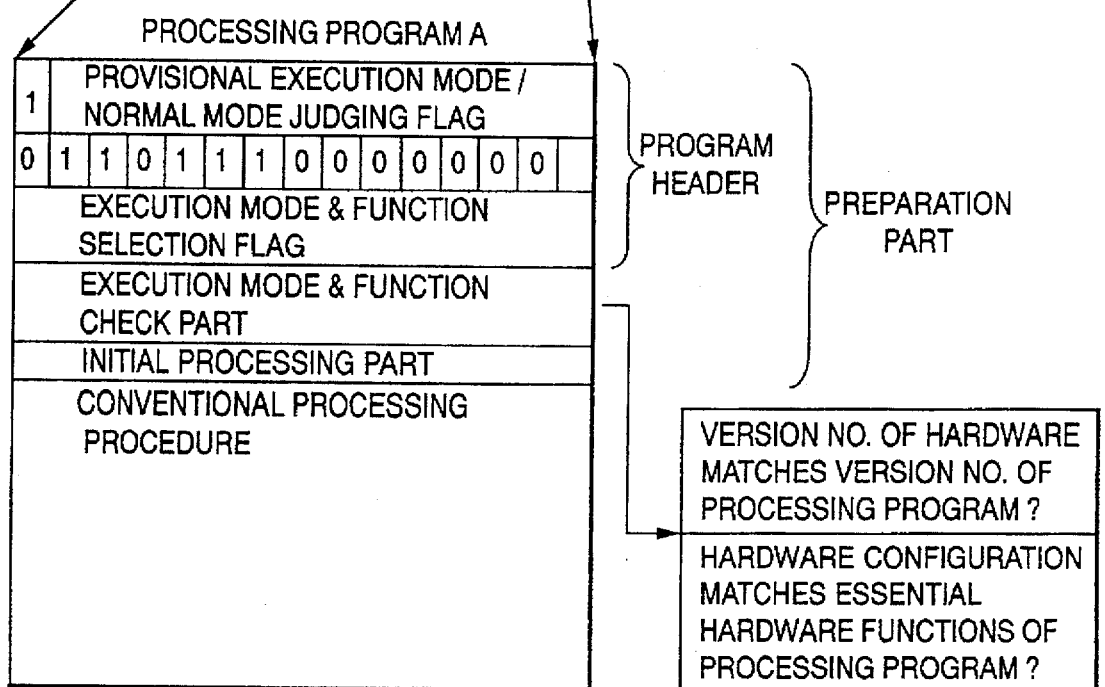
FIG. 1

PROGRAM LOADING METHOD WHICH CONTROLS LOADING OF PROCESSING PROGRAMS OF A COMPUTER FROM A SERVICE PROCESSOR WHICH SUPPORTS THE COMPUTER

BACKGROUND OF THE INVENTION

The present invention generally relates to program loading methods, and more particularly to a program loading method which controls loading of processing programs of a computer from a service processor which supports the computer.

There are demands to further increase the processing speed of computer systems. As a result, the number of test programs which test computers having a large number of functions and mechanisms has also increased. It is desirable to efficiently execute such test programs.

Conventionally, the loading of the test programs which test the functions and mechanisms of the computer is controlled from a service processor which supports the computer, so that the tests will not be affected by the environment within the computer. More particularly, a control program judges the execution modes and functions of the computer from the service processor, and an operator selects a test program which is executable on the computer depending on the configuration of the computer. The configuration of the computer includes the execution modes, functions, mechanisms and the like of the computer. The service processor loads the test program which is selected by the operator into a main storage unit of the computer, so as to execute the test program that is loaded into the computer.

However, according to the conventional program loading method, the operator must select the test program which is executable on the computer depending on the configuration of the computer. For this reason, there were problems in that the operator must carry out a troublesome operation and that the operator must be a skilled person who is very familiar with the configuration of the computer.

In addition, even if a portion of the execution mode or function of the computer is modified, it was necessary to modify the control program at the service processor. In other words, there were problems in that the control program must be modified every time a modification is made in the execution mode or function of the computer, and that the time required to develop the programs was increased thereby. The modification of the execution mode or function includes addition of a new execution mode or function. Furthermore, the operator must constantly be aware of each modification made in the configuration of the computer, and there was also a problem in that the load on the operator is large particularly if the operator must manage a large number of computers.

SUMMARY OF THE INVENTION

Accordingly, it is a general object of the present invention to provide a novel and useful program loading method in which the problems described above are eliminated.

Another and more specific object of the present invention is to provide a program loading method which does not require a skilled operator, can suppress increase of the program development time, and can automatically check the configuration of a computer and automatically judge whether or not a processing program is executable on the computer.

Still another object of the present invention is to provide a program loading method which loads a processing program that operates on a computer into the computer under control of a control program that operates on a service processor which is coupled to the computer, where the processing program includes a predetermined processing procedure part that carries out a predetermined process according to a predetermined procedure and the program loading method comprises the steps of (a) providing in the processing program a function of declaring a provisional execution mode and a process of judging whether or not the processing program is executable on the loaded computer when loading at least a portion of the processing program from the service processor to the computer, the provisional execution mode being a mode in which the processing program is provisionally executed on the computer to judge whether or not the processing program is actually executable, (b) providing in the service processor a diagnosis instruction that is called from the processing program, the diagnosis instruction including functions of cancelling the provisional execution mode and discontinuing execution of the processing program, and (c) judging whether or not the processing program is executable prior to execution of the predetermined processing procedure part within the processing program, and cancelling the provisional execution mode of the processing program from the service processor if executable and suppressing execution of the processing program from the service processor if non-executable. According to the program loading method of the present invention, a skilled operator is not required, and the increase of the program development time can be suppressed. In addition, it is possible to automatically check the configuration of a computer and automatically judge whether or not a processing program is executable on the computer. For example, even if an execution mode or a function is newly added, it is only necessary to modify the concerned processing program, and there is no need to modify the control program of the service processor.

A further object of the present invention is to provide a program loading method described above wherein a computer system is formed by a plurality of computers which are coupled to an external storage unit. each of the computers is made up of a plurality of processors, the service processor is coupled to at least one of the computers, and the program loading method further comprises the steps of (d) checking a configuration including execution modes and functions of each of the computers to which the processing program is to be loaded at a head of the processing program, and loading the processing program to other computers and main storage units under control of other processors. According to the program loading method of the present invention, it is unnecessary to load the processing program from the service processor to other processors, and the loading time of the processing program can be reduced. In addition, since there is no need to prepare the control program and the processing program in the service processor or other computers, it is possible to utilization efficiency of the service processor is improved. Further, the operator need not be aware of the configuration of the computer system, thereby simplifying the operation of the operator and making it possible even for an unskilled operator to operate the system.

Other objects and further features of the present invention will be apparent from the following detailed description when read in conjunction with the accompanying drawings.

BRIEF DESCRIPTION OF THE DRAWINGS

FIG. 1 is a system block diagram showing a computer system which is applied with a first embodiment of a program loading method according to the present invention;

DESCRIPTION OF THE PREFERRED EMBODIMENTS

Figure 2:
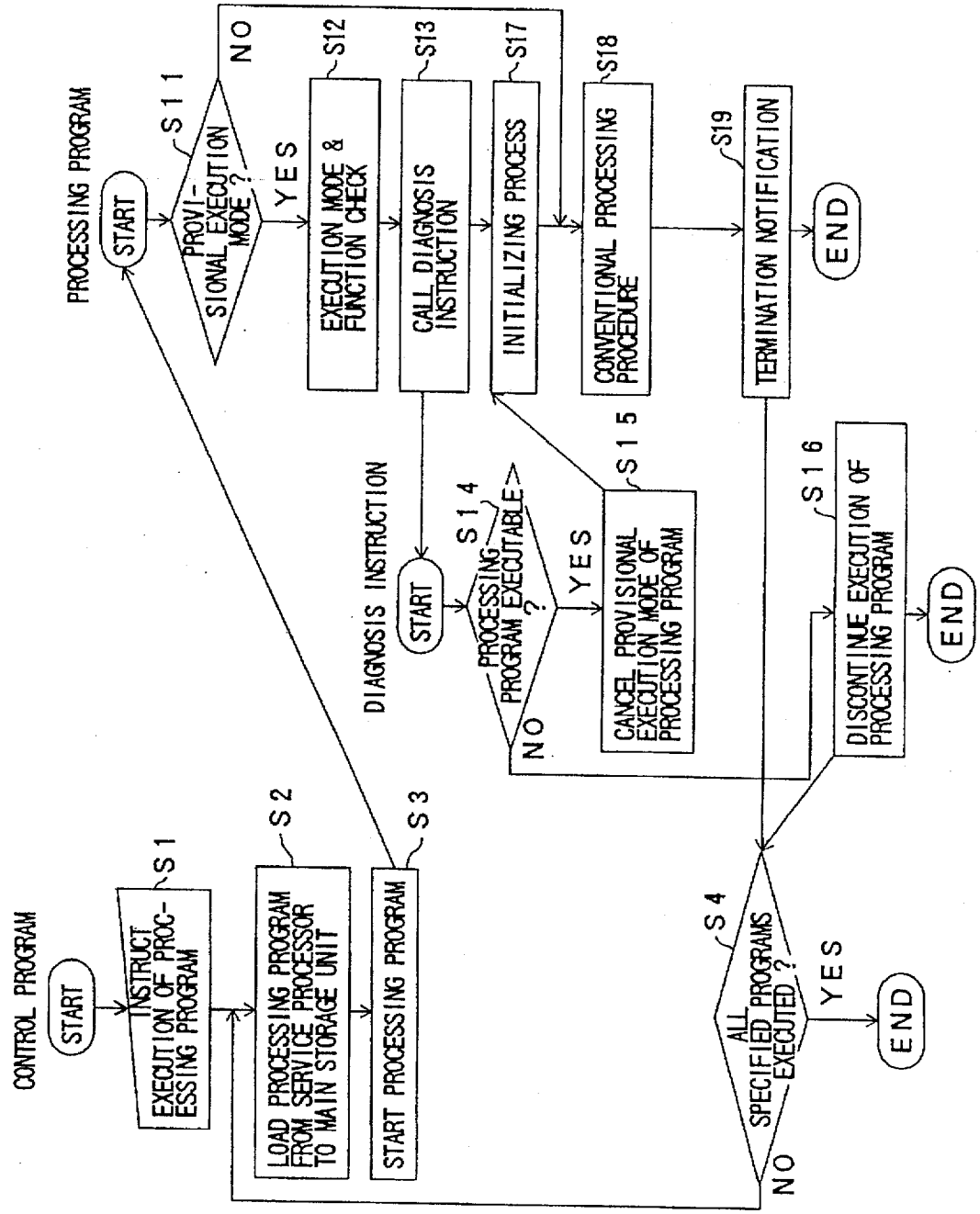
FIG. 2 is a flow chart for explaining a first embodiment of the operation of a processing program of a service processor and the operation of a processing program within a computer.

FIG. 1 is a system block diagram showing a computer system which is applied with a first embodiment of a program loading method according to the present invention. In FIG. 1, a computer 1 has a known configuration including a main storage unit 2, and executes processing programs. In addition, a service processor 11 which supports the computer 1 also has a known configuration. The service processor 11 is coupled to the computer 1 via an interface 21. A console 12, a hard disk unit 13 which is used as an external storage unit, and the like are coupled to the service processor 11. The service processor 11 operates based on an operating system (OS), and executes control programs and diagnosis programs.

The hard disk unit 13 includes one or more hard disks which store processing programs including processing programs A, B and C with respect to computers having various configurations. In this embodiment, it is assumed for the sake of convenience that the processing program A is a test program with respect to the computer 1 having a configuration A, and that the processing programs B and C respectively are test programs with respect to computers (not shown) having configurations B and C. In addition, the processing program A in this embodiment includes a provisional execution mode/normal execution mode judging flag provided at the head, an execution mode and function selection flag, an execution mode and function check part, an initial processing part, and a conventional processing procedure part. The other processing programs B and C have a construction similar to that of the processing program A.

The provisional execution mode/normal execution mode judging flag and the execution mode and function selection flag form a program header. The provisional execution mode/normal execution mode judging flag, the execution mode and function selection flag, the execution mode and function check part and the initial processing part form a preparation part of the processing program. In other words, the preparation part is formed by the program header, the execution mode and function check part, and the initial processing part. For example, in a case where a check is made to determine whether or not an execution is possible, the execution mode and function check part is a program portion which checks items such as whether or not the version number of the hardware of the computer 1 matches the version number of the processing program and whether or not the configuration of the hardware of the computer 1 matches the essential hardware function of the processing program.

The provisional execution mode refers to a mode in which a processing program is provisionally executed on the computer 1 to determine whether or not this processing program is actually executable. On the other hand, the normal execution mode refers to a mode in which a processing program is actually executed on the computer 1. The conventional processing procedure part refers to a program portion which is carried out according to a processing procedure which is the same as a conventional processing procedure. More particularly, if the processing program is a test program, the conventional processing procedure part carries out a predetermined test with respect to the computer 1 according to a predetermined procedure.

When testing the computer 1, the processing program stored in the hard disk unit 13 is read under the control of a control program of the service processor 11, and the read processing program is loaded into an address X'1000' within the main storage unit 2 of the computer 1.

FIG. 2 is a flow chart for explaining a first embodiment of the operation of the processing program of the service processor 11 and the operation of the processing program within the computer 1.

In the service processor 11, the control program instructs execution of the processing program in a step S1 shown in FIG. 2, and a step S2 loads the processing program which is read from the hard disk unit 13 into the main storage unit 2 of the computer 1. In addition, the control program starts the processing program which is loaded into the main storage unit 2. As a result, the operation of the processing program is started.

The processing program refers to the provisional execution mode/normal execution mode judging flag in a step S11 and decides whether or not the execution mode is the provisional execution mode. If the decision result in the step S11 is NO, the process advances to a step S18 which will be described later. On the other hand, if the decision result in the step S11 is YES, the processing program refers to the execution mode and function check part in a step S12 and checks the execution mode and function. In addition, the processing program calls a diagnosis instruction of the service processor 11 in a step S13. As a result, the diagnosis instruction is executed and a diagnosis process is started.

When the diagnosis process starts, a step S14 decides whether or not the processing program is executable on the computer 1. If the decision result in the step S14 is YES, a step S15 cancels the provisional execution mode of the processing program, and the process advances to a step S17. On the other hand, if the decision result in the step S14 is NO, a step S16 discontinues execution of the processing program. As a result, the diagnosis process ends and the process moves to the operation of the control program. In this case, the control program decides whether or not all of the specified programs have been executed in a step S4, and the process ends if the decision result in the step S4 is YES. If the decision result in the step S4 is NO, the process returns to the step S2.

When the provisional execution mode of the processing program is cancelled in the step S15, the processing program refers to the initial processing part in a step S17 and carries out an initializing process. In addition, the processing program refers to the conventional processing procedure part in the step S18 and carries out a process based on the conventional processing procedure. Further, the processing program makes a termination notification in a step S19. Hence, the process of the processing program ends and the process moves to the operation of the control program.

Therefore, by providing the process of checking the execution mode and function of the computer in the processing program, it becomes possible to reduce the program development time even when an execution mode or function is newly added, because it is only necessary to modify the concerned processing program and there is no need to modify the control program at the service processor.

Figure 3:
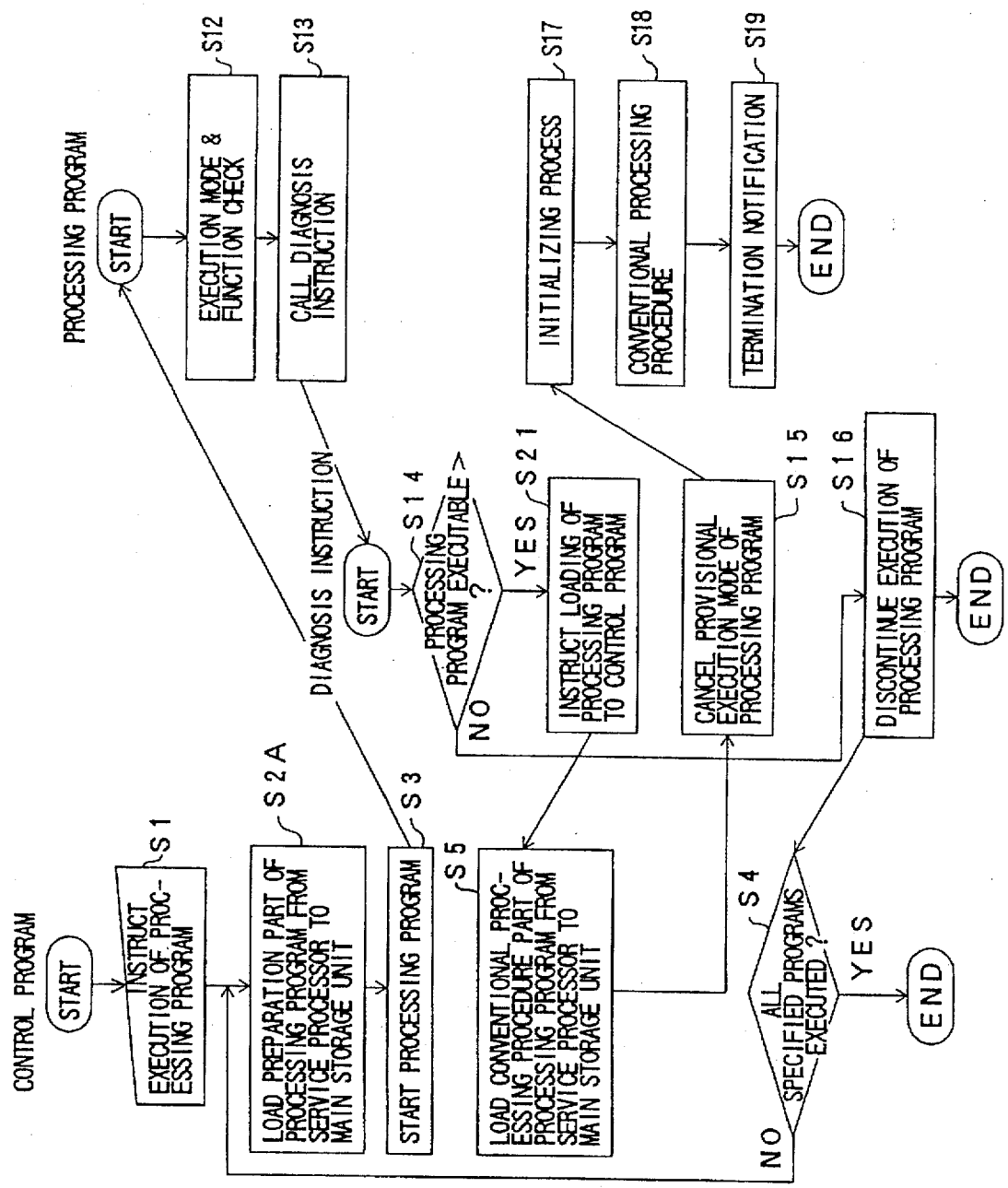
FIG. 3 is a flow chart for explaining a second embodiment of the operation of the processing program of the service processor and the operation of the processing program within the computer.

FIG. 3 is a flow chart for explaining a second embodiment of the operation of the processing program of the service processor 11 and the operation of the processing program within the computer 1. In FIG. 3, those steps which are the same as those corresponding steps in FIG. 2 are designated by the same reference numerals.

In the service processor 11, the control program instructs execution of the processing program in the step S1 shown in FIG. 3, and out of the processing program which is read from the hard disk unit 13, a step S2A loads the preparation part that is necessary to carry out the provisional execution into the main storage unit 2 of the computer 1. In addition, the control program starts the processing program which is loaded into the main storage unit 2. As a result, the operation of the processing program is started.

The processing program refers to the execution mode and function check part in the step S12 and checks the execution mode and function. In addition, the processing program calls the diagnosis instruction of the service processor 11 in the step S13. As a result, the diagnosis instruction is executed and the diagnosis process is started.

When the diagnosis process starts, the step S14 decides whether or not the processing program is executable on the computer 1. If the decision result in the step S14 is YES, a step S21 instructs the control program to load the processing program. Hence, the control program loads the conventional processing procedure part of the processing program which is read from the hard disk unit 13 into the main storage unit 2 of the computer 1 in a step S5, and the process returns to the diagnosis process. Accordingly, the step S15 cancels the provisional execution mode of the processing program, and the process advances to the step S17.

On the other hand, if the decision result in the step S14 is NO, the step S16 discontinues execution of the processing program. As a result, the diagnosis process ends and the process moves to the operation of the control program. In this case, the control program decides whether or not all of the specified programs have been executed in the step S4, and the process ends if the decision result in the step S4 is YES. If the decision result in the step S4 is NO, the process returns to the step S2.

When the provisional execution mode of the processing program is cancelled in the step S15, the processing program refers to the initial processing part in the step S17 and carries out the initializing process. In addition, the processing program refers to the conventional processing procedure part in the step S18 and carries out the process based on the conventional processing procedure. Further, the processing program makes the termination notification in the step S19. Hence, the process of the processing program ends and the process moves to the operation of the control program.

Therefore, according to this second embodiment of the program operation, the preparation part and the conventional processing procedure part of the processing program are separately loaded into the main storage unit 2 of the computer 1. For this reason, this embodiment is effective in cases where the processing program is large and thereby takes too much time to load the entire processing program in one operation.

In other words, portions of the processing program, that is, the function of declaring the provisional execution mode and the process of judging whether or not the processing program is executable, are loaded from the service processor into the main storage unit of the computer, and the judgement is made to determine whether or not the processing program is executable. If the processing program is executable, the provisional execution mode of the processing program is cancelled from the service processor, and the conventional processing procedure part is loaded into the main storage unit of the computer. On the other hand, if the processing program is not executable, the execution of the processing program is suppressed from the service processor. As a result, it is possible to reduce the loading time of the processing program.

Figure 4:
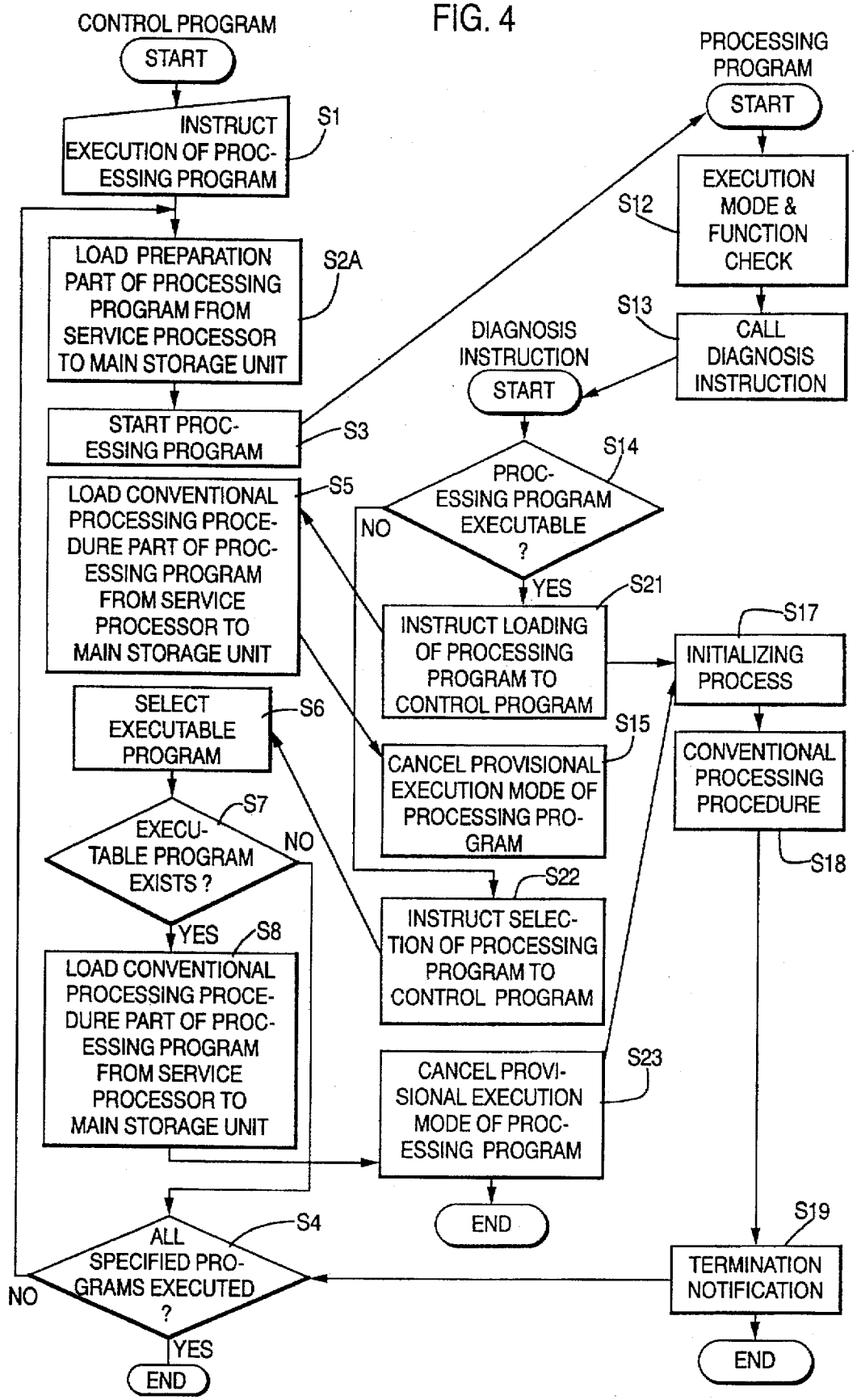
FIG. 4 is a flow chart for explaining a third embodiment of the operation of the processing program of the service processor and the operation of the processing program within the computer.

FIG. 4 is a flow chart for explaining a third embodiment of the operation of the processing program of the service processor 11 and the operation of the processing program within the computer 1. In FIG. 4, those steps which are the same as those corresponding steps in FIG. 3 are designated by the same reference numerals.

In the service processor 11, the control program instructs execution of the processing program in the step S1 shown in FIG. 3, and out of the processing program which is read from the hard disk unit 13, the step S2A loads the preparation part that is necessary to carry out the provisional execution into the main storage unit 2 of the computer 1. In addition, the control program starts the processing program which is loaded into the main storage unit 2. As a result, the operation of the processing program is started.

The processing program refers to the execution mode and function check part in the step S12 and checks the execution mode and function. In addition, the processing program calls the diagnosis instruction of the service processor 11 in the step S13. As a result, the diagnosis instruction is executed and the diagnosis process is started.

When the diagnosis process starts, the step S14 decides whether or not the processing program is executable on the computer 1. If the decision result in the step S14 is YES, the step S21 instructs the control program to load the processing program. Hence, the control program loads the conventional processing procedure part of the processing program which is read from the hard disk unit 13 into the main storage unit 2 of the computer 1 in the step S5, and the process returns to the diagnosis process. Accordingly, the step S15 cancels the provisional execution mode of the processing program, and the process advances to the step S17.

On the other hand, if the decision result in the step S14 is NO, a step S22 instructs the control program to select the processing program. Hence, the control program retrieves for the processing program stored in the hard disk unit 13 in a step S6, and selects a processing program that is executable on the computer 1. In addition, a step S7 decides whether or not a processing program executable on the computer 1 exists. If the decision result in the step S7 is YES, the control program loads the conventional processing procedure part of the processing program which is executable on the computer 1 into the main storage unit 2 of the computer 1 in a step S8, and the process returns to the diagnosis process. As a result, the provisional execution mode of the processing program is cancelled in a step S23, the diagnosis process ends, and the process advances to the step S17. In addition, if the decision result in the step S7 is NO, the control program decides whether or not all of the specified programs have been executed in the step S4, and the process ends if the decision result in the step S4 is YES. The process returns to the step S2 if the decision result in the step S4 is NO.

When the provisional execution mode of the processing program is cancelled in the step S15 or S23, the processing program refers to the initial processing part in the step S17 and carries out the initializing process. In addition, the processing program refers to the conventional processing procedure part in the step S18 and carries out the process based on the conventional processing procedure. Further, the processing program makes the termination notification in the step S19. Hence, the process of the processing program ends and the process moves to the operation of the control program.

Therefore, according to this third embodiment of the program operation, the preparation part and the conventional processing procedure part of the processing program are separately loaded into the main storage unit 2 of the computer 1. For this reason, this embodiment is effective in cases where the processing program is large and thereby takes too much time to load the entire processing program in one operation. Furthermore, even in cases where the execution of a plurality of processing programs is specified, it is possible to automatically select only the processing programs that are executable on the computer 1 and load the selected processing programs into the computer 1. Thus, it is possible to minimize loading of unnecessary or unwanted programs.

In other words, portions of the processing program, that is, the function of declaring the provisional execution mode and the process of judging whether or not the processing program is executable, are loaded from the service processor into the main storage unit of the computer, and the judgement is made to determine whether or not the processing program is executable. If the processing program is executable, the provisional execution mode of the processing program is cancelled from the service processor, and the conventional processing procedure part is loaded into the main storage unit of the computer. On the other hand, if the processing program is not executable, the execution of the processing program is suppressed from the service processor. As a result, it is possible to reduce the loading time of the processing program.

Figure 5:
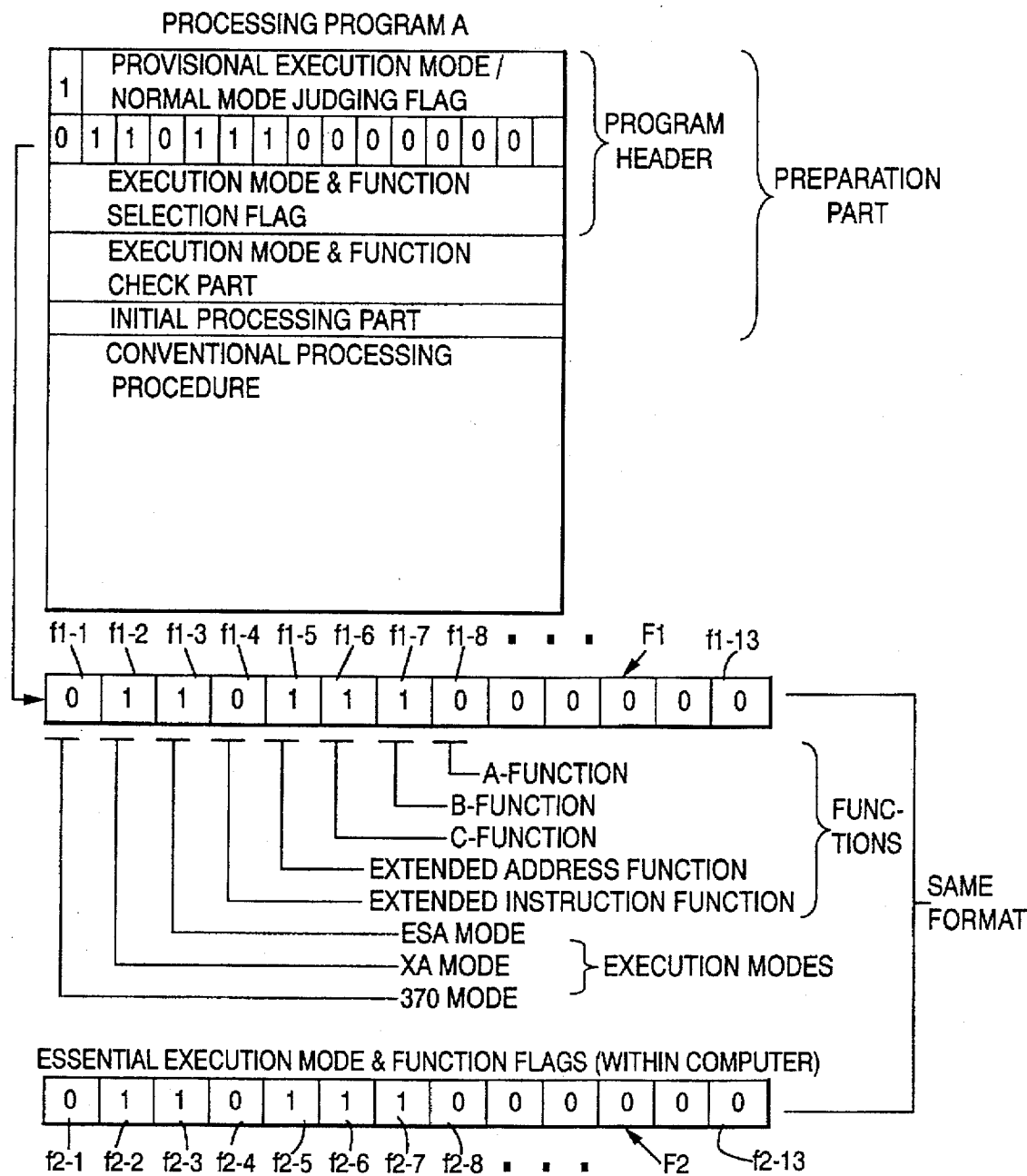
FIG. 5 is a diagram for explaining the relationship of the processing program, flags within a program header of the processing program, and flags stored within the computer.
Figure 6:
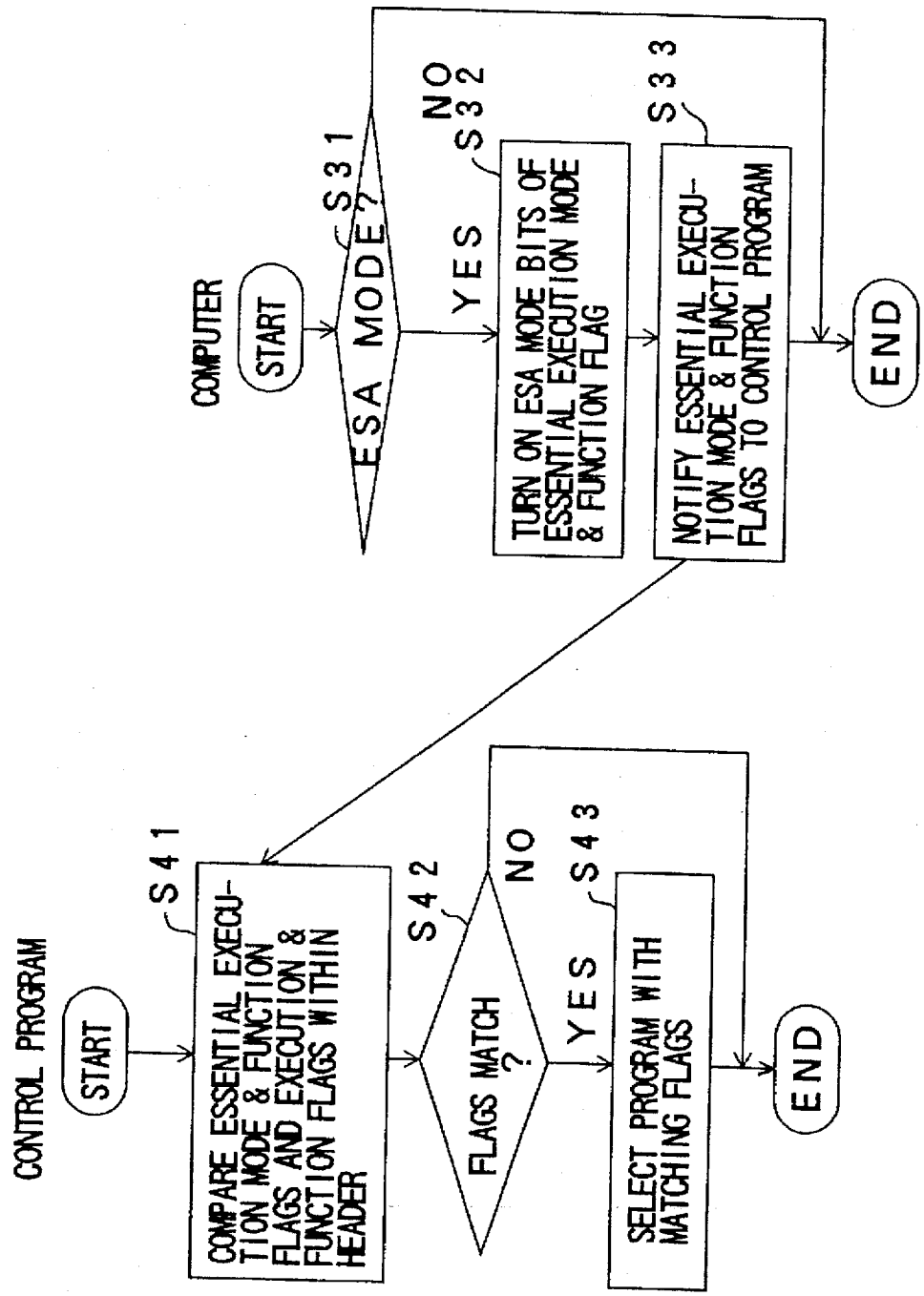
FIG. 6 is a flow chart for explaining the process of selecting a processing program which is executable on the computer.

Next, a description will be given of the operation of selecting the processing program that is executable on the computer 1 in the third embodiment of the program operation described above, by referring to FIGS. 5 and 6. FIG. 5 is a diagram for explaining the relationship of the processing program, flags within a program header of the processing program, and flags stored within the computer 1. In addition, FIG. 6 is a flow chart for explaining the process of selecting a processing program which is executable on the computer 1.

The processing program has the construction described above in conjunction with FIG. 1, and in this embodiment, a flag group F1 within the program header of the processing program has a construction shown in FIG. 5. In FIG. 5, the flag group F1 includes flags f1-1 through f1-13 which indicate functions such as A-function, B-function, C-function, extended address function and extended instruction function, and flags f2-1 through f2-13 which indicate execution modes such as ESA mode, XA mode and 370 mode.

The A-function, the B-function and the C-function are reserved functions for future use. The extended address function extends the real address space based on the IBM Enterprise System Archtecture/390 up to a maximum of 40 bits as opposed to the conventional 31 bits. The extended instruction function adds system control and general instructions to the M-series computer system as an extended function of the IBM System/370 mode. The ESA mode refers to the IBM Enterprise System Architecture/390 Mode. The XA mode refers to the IBM System/370 Extended Architecture Mode. In addition, the 370 mode refers to the IBM System/370 Mode.

On the other hand, in the computer 1, a flag group F2 is stored in an internal register of a processor or the main storage unit 2 of the computer 1. The flag group F2 includes flags f2-1 through f2-13 which indicate essential execution modes and functions. Each of the flags f2-1 through f2-13 of the flag group F2 has the same format as each of the flags f1-1 through f1-13 of the flag group F1 within the processing program, and the flags f2-1 through f2-13 respectively correspond to the flags f1-1 through f1-13. Accordingly, it is possible to discriminate the processing program that is executable on the computer 1 by comparing the flags f2-1 through f2-13 of the flag group F2 and the corresponding flags f1-1 through f1-13 of the flag group F1.

In a step S31 shown in FIG. 6, the computer 1 decides whether or not the execution mode is the ESA mode, for example, and the process ends if the decision result is NO. On the other hand, if the decision result in the step S31 is YES, a step S32 turns ON or, sets, bits of the flag f2-3 through f2-8 of the flag group F2. The flag f2-3 indicates the ESA mode which is an essential execution mode. The flags f2-4 through f2-8 indicate the essential functions of the computer 1. In addition, a step S33 notifies the flags f2-1 through f2-8 of the flag group F2 which indicate the essential execution modes and functions of the computer 1 to the control program within the service processor 11. This notification of the flag group F2 may be carried out simultaneously as the instruction to select the processing program in the step S22 shown in FIG. 4. In the particular case shown in FIG. 5, only the flag f2-3 of the flag group F2, indicating the ESA mode, is ON or set.

In the service processor 11, a step S41 compares each flag of the flag group F2 and each flag of the flag group F1 within each processing program that is read from the hard disk unit 13, in response to the notification of the flag group F2 and the instruction to select the processing program. With respect to each processing program, a step S42 decides whether or not the flags indicating the execution modes and functions match between the flag groups F2 and F1, and the process ends if the decision result is NO. On the other hand, if the decision result in the step S42 is YES, a step S43 selects the processing program for which the flags indicating the execution modes and functions match between the flag groups F2 and F1, as the processing program that is executable on the computer 1. The process ends after the step S43. Hence, the steps S41 through S43 shown in FIG. 6 correspond to the step S6 shown in FIG. 4.

Figure 7:
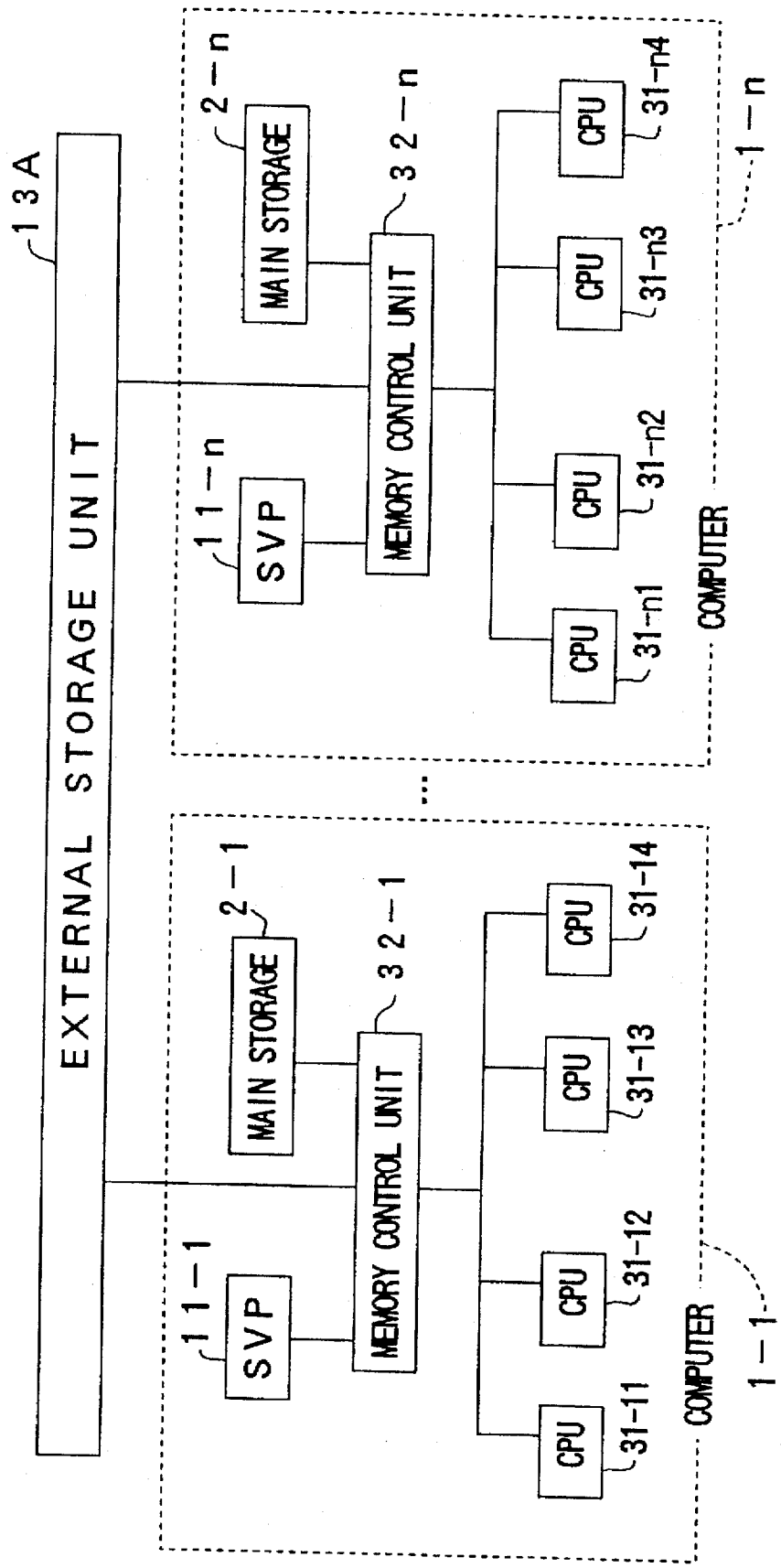
FIG. 7 is a system block diagram showing a computer system which is applied with a second embodiment of the program loading method according to the present invention.
Figure 8:
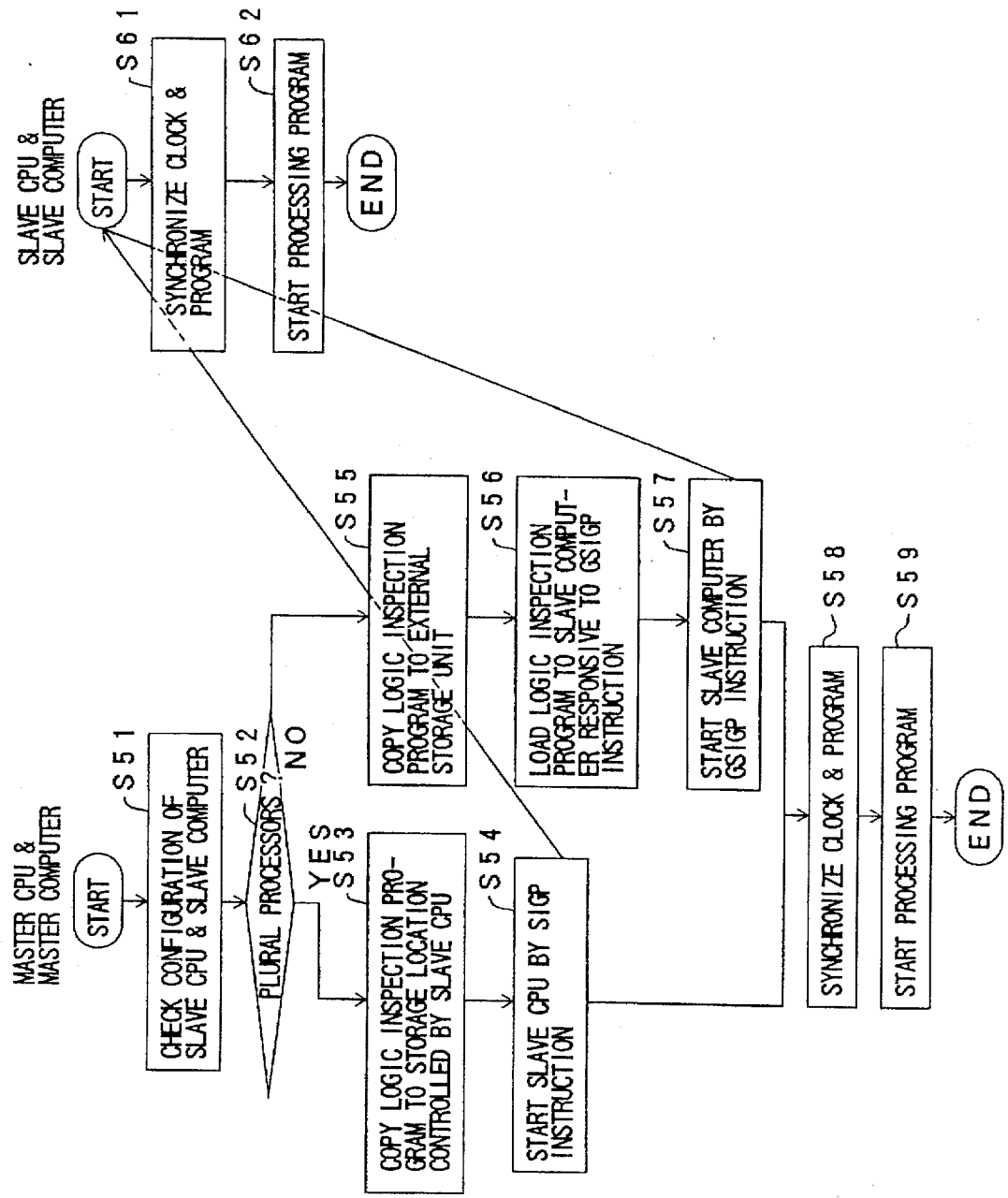
FIG. 8 is a flow chart for explaining the initializing process of the processing program.

Next, a description will be given of a second embodiment of the program loading method according to the present invention, by referring to FIGS. 7 and 8. FIG. 7 is a system block diagram showing a computer system to which the second embodiment of the program loading method is applied. FIG. 8 is a flow chart for explaining an initializing process of the processing program.

The computer system shown in FIG. 7 includes a plurality of computers 1-1 through 1-n. The computer 1-1 generally includes a main storage unit 2-1, a memory control unit 32-1, and central processing units (CPUs) 31-11 through 31-14 which are coupled as shown. In this embodiment, it is assumed for the sake of convenience that a service processor (SVP) 11-1 is also a part of the computer 1-1. However, the service processor 11-1 may of course be coupled externally to the computer 1-1, similarly to the first embodiment shown in FIG. 1. The service processor 11-1 and the main storage unit 2-1 are respectively coupled to each of the CPUs 31-11 through 31-14 via the memory control unit 32-1. The computer 1-n has a construction similar to that of the computer 1-1, and generally includes a main storage unit 2-n, a memory control unit 32-n, and CPUs 31-n1 through 31-n4 which are coupled as shown. A service processor (SVP) 11-n and the main storage unit 2-n are respectively coupled to each of the CPUs 31-n1 through 31-n4 via the memory control unit 32-n. An external storage unit 13A is coupled to the memory control units 32-1 and 32-n of the computers 1-1 and 1-n.

For example, the processing program is loaded by reading the processing program from the external storage unit 13A and loading the read processing program from the service processor 11-1 of the computer 1-1 with respect to the main storage unit 2-n of the computer 1-n, that is, with respect to the CPU 31-n1. Of course, it is sufficient for the service processor to be provided with respect to at least one computer.

When each computer is made up of a plurality of CPUs or, the computer system is made up of a plurality of computers, it is necessary to carry out the initializing process of the processing program.

In FIG. 8, when the operations of a master CPU and a master computer start, a step S51 checks the configurations of a slave CPU and a slave computer. The step S51 also resets, that is, initializes, the slave CPU. A step S52 decides whether or not a plurality of slave CPUs exist. If the decision result in the step S52 is YES, a step S53 copies a logic inspection program to a storage location within each of the main storage units controlled by the slave CPUs. In addition, a step S54 starts the slave CPUs in response to a SIGP (signal processor) instruction which controls the signal transmit/receive function among a plurality of CPUs. Further, the step S54 starts the operations of the slave CPUs and the slave computers on one hand, and advances the process to a step S58 on the other.

If the decision result in the step S52 is NO, a step S55 copies the logic inspection program to the external storage unit 13A. A step S56 loads the logic inspection program to the main storage unit of the slave computer in response to a GSIGP (global signal processor) instruction which controls the signal transmit/receive function among the computers coupled by the external storage unit. A step S57 starts the slave computer in response to the GSIGP instruction. The step S57 starts the operations of the slave CPU and the slave computer on one hand, and advances the process to the step S58 on the other.

The slave CPU and the slave computer carry out a synchronizing process to synchronize the clock and program in a step S61. The synchronizing process of the step S61 is carried out with respect to a plurality of CPUs when carried out subsequent to the step S54, and is carried out with respect to each slave computer if a plurality of slave computers exist. In addition, the synchronizing process of the step S61 is carried out with respect to each slave computer when carried out subsequent to the step S57. A step S62 starts execution of the processing program, and the process thereafter ends.

After the step S54 or S57, the step S58 carries out the synchronizing process to synchronize the clock and program with respect to the CPU of the master computer. The synchronizing process of the step S58 is carried out with respect to each of the CPUs when the master computer includes a plurality of CPUs. A step S59 starts execution of the processing program, and the process thereafter ends.

Therefore, when each computer is made up of a plurality of CPUs or, the computer system is made up of a plurality of computers, it is basically possible to apply the first through third embodiments of the program operation described above if the initializing process of the processing program is carried out.

In other words, by providing in the processing program the initializing process which includes checking the configuration of the computer, loading the processing program into other computers and main storage units that are controlled by other processors, resetting, synchronizing and the like, it becomes unnecessary to load the processing program from the service processor to other processors and the loading time of the processing program can be reduced. Furthermore, because it is unnecessary to prepare the control program and the processing program in the service processor of other computers, it is possible to efficiently utilize the service processor. In addition, the operation to be carried out by the operator is simplified because there is no need to be aware of the configuration of the computer system, and the operation can be made even by an operator who is not very skilled.

Further, the present invention is not limited to these embodiments, but various variations and modifications may be made without departing from the scope of the present invention.

What is claimed is:

1. A program loading method which loads a processing program that operates on a computer into the computer under control of a control program that operates on a service processor which is coupled to the computer, said processing program including a predetermined processing procedure part that carries out a predetermined process according to a predetermined procedure, said program loading method comprising the steps of:

(a) providing in the processing program a function of declaring a provisional execution mode and a process of judging whether or not the processing program is executable on the loaded computer when loading at least a portion of the processing program from the service processor to the computer, said provisional execution mode being a mode in which the processing program is provisionally executed on the computer to judge whether or not the processing program is actually executable;

(b) providing in the service processor a diagnosis instruction that is called from the processing program, said diagnosis instruction including functions of cancelling the provisional execution mode and discontinuing execution of the processing program; and (c) judging whether or not the processing program is executable prior to execution of the predetermined processing procedure part within the processing program, and cancelling the provisional execution mode of the processing program from the service processor if executable and suppressing execution of the processing program from the service processor if non-executable.

2. The program loading method as claimed in claim 1, wherein said step (a) indicates the function of declaring the provisional execution mode and the process of judging whether or not the processing program is executable on the loaded computer by flags and providing the flags in the processing program.

3. The program loading method as claimed in claim 2, wherein said processing program includes a preparation part and the predetermined processing procedure part, and said step (a) provides the flags in the preparation part.

4. The program loading method as claimed in claim 1, wherein said processing program includes the predetermined processing procedure part and a preparation part which indicates the function of declaring the provisional execution mode and the process of judging whether or not the processing program is executable on the loaded computer, and said step (c) loads the cancellation of the provisional execution mode of the processing program and the predetermined processing procedure part from the service processor to the computer if the processing program is executable.

5. The program loading method as claimed in claim 4, wherein said step (c) selectively loads another processing program which is executable from the service processor to the computer if the processing program is non-executable.

6. The program loading method as claimed in claim 4, wherein said step (c) judges whether or not the processing program is executable based on the preparation part and a configuration of the computer including execution modes and functions of the computer.

7. The program loading method as claimed in claim 5, wherein said step (c) judges whether or not the processing program is executable based on the preparation part and a configuration of the computer including execution modes and functions of the computer.

8. The program loading method as claimed in claim 4, wherein:

said step (c) notifies a configuration of the computer including execution modes and functions of the computer to the service processor if the processing program is non-executable;

and said program loading method further comprises the steps of:

(d) retrieving, in the service process, a processing program that is executable on the computer from processing programs stored in an external storage unit based on the configuration of the computer.

9. The program loading method as claimed in claim 5, wherein:

said step (c) notifies a configuration of the computer including execution modes and functions of the computer to the service processor if the processing program is non-executable;

and said program loading method further comprises the steps of:

(d) retrieving, in the service process, a processing program that is executable on the computer from processing programs stored in an external storage unit based on the configuration of the computer.

10. The program loading method as claimed in claim 6, wherein:

said step (c) notifies the configuration of the computer including execution modes and functions of the computer to the service processor if the processing program is non-executable;

and said program loading method further comprises the steps of:

(d) retrieving, in the service process, a processing program that is executable on the computer from processing programs stored in an external storage unit based on the configuration of the computer.

11. The program loading method as claimed in claim 1, wherein said processing program includes a test program which tests functions and mechanisms of the computer.

12. The program loading method as claimed in claim 1, wherein:

a computer system is formed by a plurality of computers which are coupled to an external storage unit;

each of the computers is made up of a plurality of processors;

said service processor is coupled to at least one of the computers;

and said program loading method further comprises the steps of:

(d) checking a configuration including execution modes and functions of each of the computers to which the processing program is to be loaded at a head of the processing program, and loading the processing program to other computers and main storage units under control of other processors.

13. The program loading method as claimed in claim 12, which further comprises the steps of:

(e) providing an initializing process including resetting and synchronization to the processing program.

* * * * *

UNITED STATES PATENT AND TRADEMARK OFFICE
CERTIFICATE OF CORRECTION

PATENT NO. : 5,680,623
DATED : October 21, 1997
INVENTOR(S) : ONUMA

It is certified that error appears in the above-identified patent and that said Letters Patent is hereby corrected as shown below:

Col. 11, line 10, change "providing" to --provides--;
line 47, after "non-executable;" insert --and--;
line 48, delete "and";
line 49, change "steps" to --step--.

Col. 12, line 7, after "non-executable;" insert --and--;
line 8, delete "and";
line 9, change "steps" to --step--;
line 20, after "non-executable;" insert --and--;
line 21, delete "and";
line 22, change "steps" to --step--;
line 23, change "process" to --processor--;
line 38, after "computers;" insert --and--;
line 39, delete "and";
line 44, change "," to --;-- and after "and" insert a paragraph break and begin the paragraph with --(e)--;
line 48, change "steps" to --step--.

Signed and Sealed this

Fourteenth Day of July, 1998

Attest:

BRUCE LEHMAN

*Attesting Officer*                    *Commissioner of Patents and Trademarks*